(12) United States Patent
Odaka

(10) Patent No.: US 8,059,189 B2
(45) Date of Patent: Nov. 15, 2011

(54) IMAGE CAPTURING APPARATUS AND IMAGE CAPTURING METHOD

(75) Inventor: Yukio Odaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

(21) Appl. No.: 12/176,610

(22) Filed: Jul. 21, 2008

(65) Prior Publication Data

US 2008/0284874 A1    Nov. 20, 2008

Related U.S. Application Data

(63) Continuation of application No. 11/208,280, filed on Aug. 19, 2005, now Pat. No. 7,433,589.

(30) Foreign Application Priority Data

Aug. 24, 2004 (JP) ................................ 2004-244127

(51) Int. Cl.
*H04N 5/222* (2006.01)
(52) U.S. Cl. ...................................... 348/370; 396/166
(58) Field of Classification Search .................... None
See application file for complete search history.

(56) References Cited

U.S. PATENT DOCUMENTS

| | | | |
|---|---|---|---|
| 6,753,920 B1 | 6/2004 | Momose et al. | |
| 7,039,307 B2 | 5/2006 | Uchida | |
| 2004/0201731 A1* | 10/2004 | Kakinuma et al. | 348/229.1 |
| 2004/0212725 A1* | 10/2004 | Raskar | 348/370 |
| 2005/0046739 A1* | 3/2005 | Voss et al. | 348/371 |
| 2005/0243198 A1* | 11/2005 | Pardikes | 348/370 |

FOREIGN PATENT DOCUMENTS

| | | | |
|---|---|---|---|
| JP | 9-261526 A | | 10/1997 |
| JP | 09261526 A | * | 10/1997 |
| JP | 10-093850 | | 4/1998 |
| JP | 10093850 A | * | 4/1998 |
| JP | 2000-078462 A | | 3/2000 |
| JP | 3110797 B2 | | 9/2000 |
| JP | 2000-299813 A | | 10/2000 |
| JP | 2002-64743 A | | 2/2002 |
| JP | 2002-107787 A | | 4/2002 |
| JP | 2002-268112 A | | 9/2002 |

* cited by examiner

*Primary Examiner* — Lin Ye
*Assistant Examiner* — Dennis Hogue
(74) *Attorney, Agent, or Firm* — Canon U.S.A., Inc., IP Division

(57) ABSTRACT

An image capturing apparatus performs photographing multiple times and composing these multiple images to obtain one image of a correct exposure. The apparatus includes an image capturing unit, an illumination unit and an image composition unit. The image capturing unit captures an optical image of an object as an electrical signal. The illumination unit performs illumination on photographing by the image capturing unit. The image composition unit composes multiple images obtained by multiple times of photographing by the image capturing unit. All of the multiple images are the images shot by performing illumination with the illumination unit. A light amount of each photographing in multiple times of photographing by performing illumination with the illumination unit is obtained by dividing light amount required for the correct exposure based on the number of photos taken of an image to be composed.

4 Claims, 11 Drawing Sheets

IMAGE CAPTURING APPARATUS AND IMAGE CAPTURING METHOD

INCORPORATION BY REFERENCE

This application is a continuation of application Ser. No. 11/208,280 filed on Aug. 19, 2005, and claims priority to Japanese Patent Application No. 2004-244127 filed on Aug. 24, 2004. The entire contents of each of those applications are hereby incorporated by reference.

FIELD OF THE INVENTION

The present invention relates to an image capturing apparatus and an image capturing method for photographing by using an auxiliary light.

BACKGROUND OF THE INVENTION

Conventionally, a speed light device (flash unit) using a xenon tube has been used as an auxiliary light for a still image in the case of a silver salt camera, a video camera and an electronic still camera. The speed light device charges a main capacitor with a high voltage of 300 V or so, and has this charging energy discharged via the xenon tube to convert it to emission energy and illuminate an object. Therefore, a high-voltage portion is laid out on a compact body, and so there are many layout restrictions in terms of substrate mounting, such as a creeping distance problem including pattern spacing and placement of a large main capacitor.

As opposed to this, a white LED can emit light by applying a voltage of a few V. Therefore, it has no problem of a creeping distance from another component in the case of handling the high voltage. If the voltage and performance of a battery are high, the white LED can be driven directly from the battery so that it no longer requires the main capacitor taking a large space, which is a merit in view of miniaturization.

The white light-emitting diode (hereafter, white LED) is now used as the auxiliary light for a camera cell-phone, a camera for medical use and so on.

However, the white LED has a luminance remarkably lower than the xenon tube used for the speed light device. For this reason, it has been used, due to its limited shooting distance, for a macro speed light device used at a short distance and the camera cell-phone for photographing in a hand-held range.

A light volume of the speed light device is indicated by a guide number (hereafter, GNo.), and is decided by ISO sensitivity, shutter second time (also referred to as shutter speed, same hereafter) and a light volume (cdsec) from a light source. For instance, if the white LED of 10 cd is energized for 1/30 second and the ISO sensitivity is 100, GNo. is 0.41. GNo. of a general built-in speed light device is 6 to 14 or so, where it requires the light volume of about 215 to 1200 times in order to have this light volume.

However, current low-noise techniques have advanced, and the ISO sensitivity can also be set high. Recently, it is reaching a level where there is no problem in terms of photographing even if the ISO sensitivity is increased to ISO 800.

Luminous efficiency of the white LED itself is also improved at a rapid rate, and it is expected as the auxiliary light of the image capturing apparatus. The efficiency of the current general white LED of a high-luminance type has reached approximately 40 (lm/W) and will reportedly reach a fluorescent level (80 to 100 lm/W) in near future. The white LEDs of a power-type of 1 W or more are currently at 20 to 25 lm/W, and the efficiency thereof is also being improved at a rapid rate likewise. Therefore, in the case where the ISO sensitivity becomes 8 times higher and the efficiency of the white LED becomes 3 times higher, a necessary light volume will be reached by 9 to 50 white LEDs and so it is only one step away from practical use. The white LEDs have also reduced cost.

Given the present circumstances, however, the luminance of the white LED is lower than that of the xenon tube and so multiple pieces thereof must be used, which is a significant problem in terms of the cost and space.

Therefore, it is necessary to reduce the required quantity to the minimum quantity. If the shutter second time on photographing is extended to obtain the light volume for the reason of the insufficient luminance, there occurs a problem of hand shake even though the guide number becomes larger.

As for the problem of the hand shake, there is a presented technique for the electronic still camera as an effective correction technique, wherein multiple images are continuously shot in the shutter second time enough to cause no hand shake and are composed while being aligned in a process after the photographing so as to obtain the images with no hand shake (Japanese Patent Laid-Open No. 2002-064743 for instance).

For instance, according to Japanese Patent No. 3110797 proposed by the inventors hereof, there is a disclosed technique wherein sequentially captured images are composed after performing coordinate transformation on multiple screens correspondingly to displacements over time.

According to Japanese Patent Laid-Open No. 9-261526 for instance, there is a disclosed technique wherein multiple images are shot likewise and are composed while correcting the displacements so as to obtain the images with no displacement.

According to Japanese Patent Laid-Open No. 2000-299813, there is a disclosed technique wherein continuously shot image data is recorded as motion JPEG data together with hand shake data and is reproduced while correcting the displacements according to the recorded hand shake data on reproduction.

However, even the techniques disclosed in the above documents have not resolved the issue of correcting the hand shake and reducing the used quantity of the white LED generating auxiliary light to reduce the cost.

To be more specific, Japanese Patent No. 3110797 discloses an example of applying it to the video camera. However, it does not disclose a technique for performing a hand shake correction and a synthesis in post-processing, and so it is not related to a method of efficiently using the auxiliary light.

Japanese Patent Laid-Open No. 9-261526 discloses an application to the electronic still camera. However, it only discloses an embodiment performed in the camera as to the hand shake correction and synthesis as with Japanese Patent No. 3110797. Therefore, it does not propose the method of using the auxiliary light.

Furthermore, according to Japanese Patent Laid-Open No. 2000-299813, the continuously shot multiple images are recorded as a motion picture of Motion JPEG so that the multiple images are associated. However, it is intended to reproduce them while correcting the displacements on reproduction. And it discloses no means for obtaining one image with no hand shake by means of image composition. It is not related to the use of the auxiliary light.

Japanese Patent Laid-Open No. 2002-064743 discloses a method for generating a bright image with no hand shake by composing multiple images. However, it does not describe emitting light from the white LED by using the white LED as illumination unit.

The present invention has been made in view of the problems, and an object thereof is to realize an image capturing technique capable of obtaining an image of a correct exposure with no hand shake by using no illumination of which light volume and power consumption are high such as the speed light device.

Another object is, on using the white LED as the auxiliary light, to reduce the used quantity of the white LED in order to solve the problems in terms of the cost and space. For this object, multiple images are shot with the auxiliary light in the shutter second time enough to cause no hand shake and are composed while correcting a hand shake amount so as to reduce the used quantity of the white LED and obtain the images with no hand shake. It is not always necessary to perform the process of the hand shake correction and synthesis in the electronic still camera. It is also possible to only shoot the multiple images in the electronic still camera and perform the hand shake correction and synthesis by capturing them on a personal computer (hereafter, a PC).

When post-processing the images on the PC, it is possible, with many of single-lens reflex electronic still cameras and high-class compact electronic still cameras, to store raw data images obtained from an image capturing element as-is (generally called raw images). The raw images cannot be seen as-is as the images. However, they can be converted to JPEG images while performing color temperature correction, tone correction and exposure compensation (referred to as a development process because of a silver salt image) on the PC. Such post-processing on the PC is generally performed.

Furthermore, it is necessary to reduce the time from image capturing to image recording in the electronic still camera due to demands for the increased number of pixels of the image capturing element and improvement in continuous shooting performance. Thus, there is a merit of reducing a load on the electronic still camera side by performing the hand shake correction and synthesis in the post-processing. The present invention also reduces the used quantity of the white LED and obtains the images of a correct exposure by using the white LED as the auxiliary light and shooting multiple images of a low luminance requiring a low light volume to compose the obtained images in the post-processing.

SUMMARY OF THE INVENTION

To solve the problems, an image capturing apparatus of the present invention is the one for performing photographing multiple times in an exposure time in which no occurrence of a hand shake is expected and composing these multiple images to obtain one image of a correct exposure, the apparatus comprising: an image capturing unit adapted to capture an optical image of an object as an electrical signal; an illumination unit adapted to perform illumination on photographing by the image capturing unit; and an image composition unit adapted to compose multiple images obtained by multiple times of photographing by the image capturing unit, wherein all of the multiple images are the images shot by performing illumination with the illumination unit.

An image capturing method of the present invention is the one for performing photographing multiple times in an exposure time in which no occurrence of a hand shake is expected and composing these multiple images to obtain one image of a correct exposure, the method comprising: an image capturing step of capturing an optical image of an object as an electrical signal; an illumination step of performing illumination by the illumination unit on photographing in the image capturing step; and an image composition step of composing multiple images obtained by multiple times of photographing in the image capturing step, wherein all of the multiple images are the images shot by performing illumination with the illumination unit.

According to the present invention, all the images to be composed are obtained by the photographing accompanied by the illumination (LED). Therefore, a luminance value of each image is smaller than that in the case of using a speed light device. However, it is possible, as the illumination of low power consumption capable of continuous emission is used, to obtain an image of a correct exposure with no hand shake by using no illumination of which light volume and power consumption are high such as the speed light device.

It divides an auxiliary light and performs exposure to shoot the multiple low-luminance images, and composes the multiple images thereby obtained so as to obtain the correct exposure. Therefore, the light volume is lower than that in the case of rendering it correct just by performing exposure once so that it is possible to decrease the light volume of one or multiple light-emitting diodes or a required quantity thereof.

It has a white light-emitting LED and the speed light device of a xenon tube as the auxiliary light for the photographing. Of the white light-emitting LED of a low luminance and the speed light device of a high luminance, the auxiliary light by means of the white light-emitting LED or that by means of the speed light device is selected in the case where a distance is long or an FNo. of a lens is dark, that is, depending on photographing conditions related to GNo. In the case of a relatively short distance and when using the auxiliary light of the white light-emitting LED, it divides the auxiliary light and performs exposure to shoot the multiple low-luminance images and compose the multiple images thereby obtained so as to obtain the correct exposure. In the case of a relatively long distance, it performs photographing by the speed light device of a correct exposure once so that it is possible to eliminate the time necessary to charge the speed light device in the case of the relatively short distance, and dimmer accuracy can be improved because an emission volume of the white light-emitting LED is more stable than that of the speed light device and so emission is easily controllable.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

First Embodiment

Figure 1:
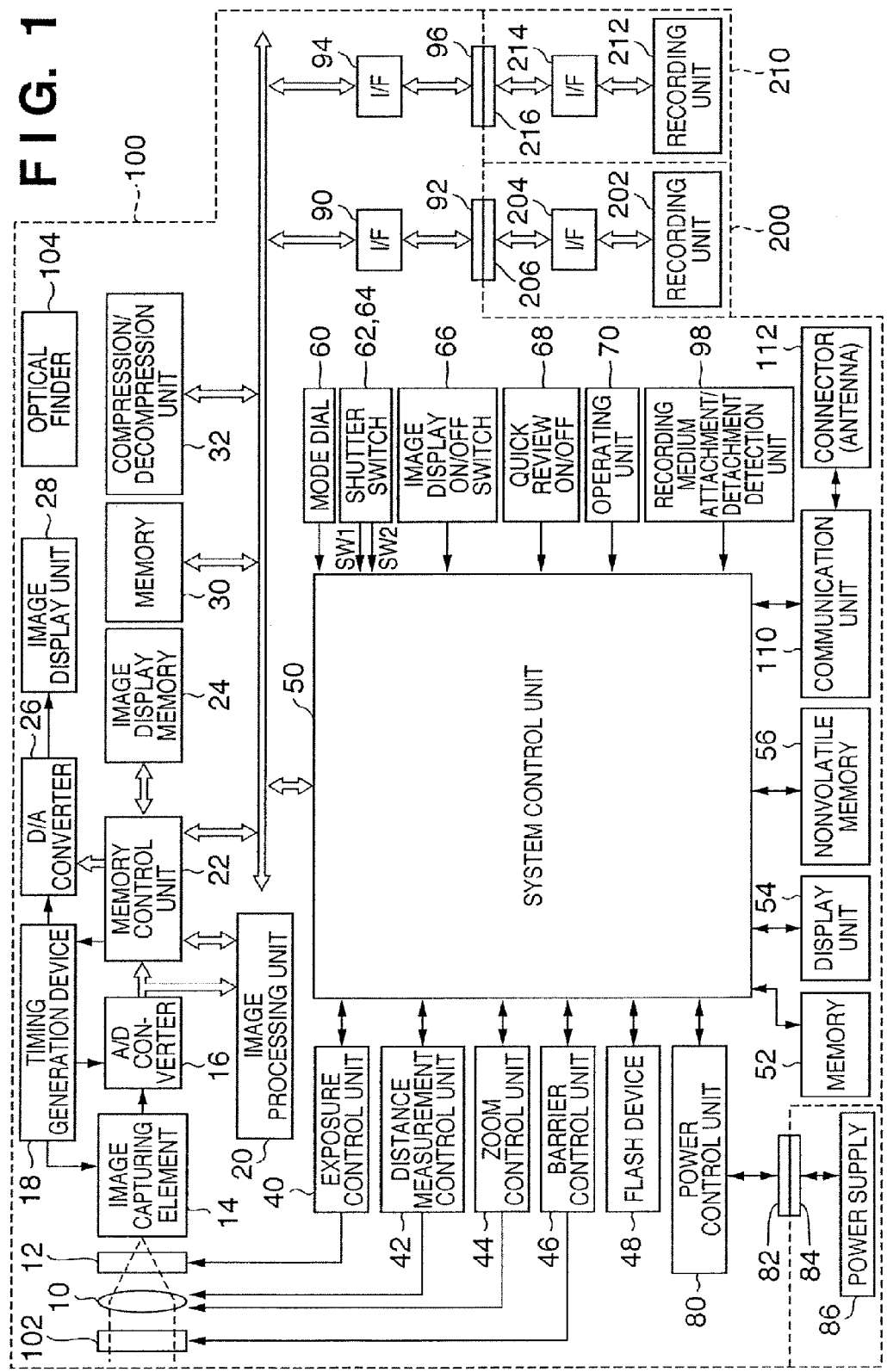
FIG. 1 is a block diagram showing a configuration of an image capturing apparatus used in common in first to third embodiments of the present invention.

Hereunder, embodiments of the present invention will be described by referring to the drawings.

FIG. 1 is a diagram showing a configuration of an image capturing apparatus according to a first embodiment of the present invention. In FIG. 1, reference numeral 100 denotes the image capturing apparatus, and reference numeral 50 denotes a system control device which controls the entire image capturing apparatus 100. Reference numeral 10 denotes a objective lens, 12 denotes a shutter having an aperture function, 14 denotes an image capturing element for converting an optical image to an electrical signal, and 16 denotes an A/D converter for converting an analog signal output of the image capturing element 14 to a digital signal. Reference numeral 18 denotes a timing generation device which provides clock signals and control signals to the image capturing element 14, A/D converter 16 and a D/A converter 26 mentioned later, and is controlled by a memory control device 22 mentioned later and the system control device 50.

Reference numeral 20 denotes an image processing device which performs predetermined pixel interpolation process and color conversion process to data from the A/D converter 16 or the data from the memory control device 22.

The image processing device 20 performs a predetermined computation by using captured image data, and the system control device 50 performs an AF (auto focus) process, an AE (automatic exposure) process and an EF (flash pre-firing) process of a TTL (through the lens) method for controlling an exposure control unit 40 and a distance measurement control unit 42 mentioned later based on obtained computation results.

Furthermore, the image processing device 20 performs a predetermined computation by using the captured image data, and performs an AWB (auto white balance) process of the TTL method based on the obtained computation results.

Reference numeral 22 denotes the memory control device which controls the A/D converter 16, timing generation device 18 and image processing device 20, and an image display memory 24, D/A converter 26, a memory 30 and a compression/decompression device 32 mentioned later.

The data of the A/D converter 16 is written to the image display memory 24 or the memory 30 mentioned later via the image processing device 20 and memory control device 22 or directly via the memory control device 22.

Reference numeral 24 denotes the image display memory, 26 denotes the D/A converter and 28 denotes an image display unit consisting of a TFT, an LCD and so on, where the image data for display written to the image display memory 24 is displayed by the image display unit 28 via the D/A converter 26.

It is possible to implement an electronic finder function by sequentially displaying the captured image data by using the image display unit 28.

The image display unit 28 can arbitrarily turn the display on and off according to an instruction of the system control device 50. In the case where the display is turned off, the power consumption of the image capturing apparatus 100 can be significantly reduced.

Reference numeral 30 denotes the memory for storing shot still images and dynamic images, which has a sufficient storage capacity for storing a predetermined number of still images and dynamic images of a predetermined time.

It is thereby possible to perform high-speed and substantial image writing to the memory 30 in the cases of continuous shooting for continuously shooting multiple still images and panoramic shooting. The memory 30 can also be used as a work area of the system control device 50.

Reference numeral 32 denotes the compression/decompression device for compressing and decompressing the image data by adaptive and discrete cosine transform (ADCT), which reads the images stored in the memory 30 and performs a compression process or a decompression process so as to write the processed data to the memory 30.

Reference numeral 40 denotes the exposure control unit for controlling the shutter 12 having the aperture function, which has a flash dimmer function by working with a flash device 48 mentioned later.

Reference numeral 42 denotes the distance measurement control unit for controlling focusing of the objective lens 10, 44 denotes a zoom control unit for controlling zooming of the objective lens 10, and 46 denotes a barrier control unit for controlling an operation of protection unit which is a barrier of reference numeral 102.

Reference numeral 48 denotes the flash device as first illumination unit using a white LED at a low luminance, which also has a floodlight function of an AF auxiliary light and the flash dimmer function. Reference numeral 49 denotes a speed light device as second illumination unit using a xenon tube of a higher luminance than the white LED (used in the second embodiment), which also has a floodlight function of the AF auxiliary light and the flash dimmer function. The exposure control unit 40 and the distance measurement control unit 42 are controlled by using the TTL method, where the system control device 50 exerts control over the exposure control unit 40 and the distance measurement control unit 42 based on the results of computing the captured image data with the image processing device 20.

The system control device 50 controls the entire image capturing apparatus 100, and reference numeral 52 denotes a memory for storing constants, variables and programs for the operation of the system control device 50.

Reference numeral 54 denotes a display unit of a liquid crystal display or a speaker for displaying an operational state or a message by using characters, images and voice according to execution of the program in the system control device 50, which is placed at a single or multiple locations easily viewable near an operating unit of the image capturing apparatus 100 and is configured by a combination of the LCD, LED, a sounding element and so on.

The display unit 54 has a part of its functions installed inside an optical finder of reference numeral 104. Of the display contents of the display unit 54, there are the contents to be displayed on the LCD and so on, such as a single shot/continuous shooting display, a self-timer display, a compression ratio display, a recording pixel number display, a recording number display, a remaining photographable number display, a shutter speed display, an aperture value display, an exposure correction display, a flash display, a red-eye reduction display, a macro photographing display, a buzzer setup display, a clock battery power display, a battery power display, an error display, a multi-digit number information display, a recording media 200 and 210 attachment/detachment status display, a communication I/F operation display, a date/time display and a vibration control function display.

Of the display contents of the display unit 54, there are the contents to be displayed inside the optical finder 104, such as a focusing display, a hand shake alert display, a flash display, a shutter speed display, an aperture value display and an exposure correction display.

Reference numeral 56 denotes a nonvolatile memory electrically erasable and recordable for which an EEPROM is used for instance.

Reference numerals 60, 62, 64, 66, 68 and 70 denote operating unit for inputting various operational instructions of the system control device 50, which are configured by a single or plural combinations of a switch, a dial, a touch panel, pointing by line of sight detection, a speech recognition device and so on.

Here, these operating unit will be concretely described. Reference numeral 60 denotes a mode dial switch capable of switching and setting up functional modes, such as power-off, an automatic shooting mode, a shooting mode, a panoramic shooting mode, a reproduction mode, a multi-screen reproduction/erasure mode and a PC connection mode.

Reference numeral 62 denotes a shutter switch SW1 which becomes on in the middle of the operation of an unshown shutter button and provides instructions to start the operations of the AF (auto focus) process, AE (automatic exposure) process, AWB (auto white balance) process, EF (flash pre-firing) process and so on.

Reference numeral 64 denotes a shutter switch SW2 which becomes on when the operation of the unshown shutter button is complete. The shutter switch SW2 provides instructions to start the operations of a series of processes, that is, an exposure process for writing a signal read from the image capturing element 14 as the image data to the memory 30 via the A/D converter 16 and memory control device 22, a development process using the computations in the image processing device 20 and memory control device 22, and a recording process for reading the image data from the memory 30 and compressing it in the compression/decompression device 32 to write the image data to the recording medium 200 or 210 mentioned later.

Reference numeral 66 denotes an image display on/off switch capable of setting up on and off of the image display unit 28. Because of this function, it is possible, on setting up off of the image display unit 28 and performing shooting by using the optical finder 104, to interrupt a current supply to the image display unit consisting of the TFT, LCD and so on so as to contribute to power saving.

Reference numeral 68 denotes a quick review on/off switch, which sets up a quick review function of automatically reproducing the shot image data immediately after the shooting.

Reference numeral 70 denotes the operating unit consisting of various buttons, a touch panel and so on, such as a menu button, a set button, a macro button, a multi-screen reproduction page break button, a flash setup button, a single/continuous/self-timer switch button, a menu shift + (plus) button, a menu shift − (minus) button, a reproduced image shift + (plus) button, a reproduced image − (minus) button, a shooting image quality selection button, an exposure correction button and a date/time setting button.

Reference numeral 80 denotes a power control unit which is configured by a battery detection device, a DC to DC converter, a switch device for switching a block to be energized and so on. The power control unit detects whether or not the battery is mounted, a kind of battery and the battery power, and controls the DC to DC converter based on detection results and the instruction of the system control device 50 so as to supply a necessary voltage to the units including the recording media for a necessary period.

Reference numeral 82 denotes a connector, 84 denotes a connector, and 86 denotes a power supply unit consisting of a primary battery such as an alkali cell or a lithium battery, a secondary battery such as an NiCd battery, an NiMH battery or an Li ion battery, an AC adapter and so on.

Reference numeral 90 and 94 denote interfaces with the recording media such as a memory card and a hard disk, 92 and 96 denote the connectors for making connections with the recording media such as the memory card and hard disk, 98 denotes a recording medium attachment/detachment detection unit for detecting whether or not the recording medium 200 or 210 is mounted on the connector 92 or 96. According to this embodiment, it is described that there are two systems of the interfaces and connectors for attaching the recording media. As a matter of course, however, there may be either a single or an arbitrary number of two or more systems of the interfaces and connectors for attaching the recording media. It may also have a configuration having the interfaces and connectors of different specifications in combination.

As for the interfaces and connectors, it is possible to use a PCMCIA card, a CF (CompactFlash®) card or others in compliance with various recording medium standards.

Furthermore, in the case of configuring it by using those in compliance with the standards such as the PCMCIA card and CF (CompactFlash®) card as the interfaces 90, 94 and connectors 92, 96, it is possible to mutually transfer the image data and management information attached to the image data between itself and another computer and peripherals including a printer by connecting various communication cards thereto including an LAN card, a modem card, a USB card, an IEEE 1394 card, a P1284 card, an SCSI card and a communication card of PHS and so on.

Reference numeral 102 denotes a protection unit as a barrier for preventing a stain or a damage of an image capturing unit including the lens 10 of the image capturing apparatus 100 by covering the image capturing unit.

Reference numeral 104 denotes the optical finder capable of photographing by using only the optical finder without using the electronic finder function of the image display unit 28. The optical finder 104 has a part of the functions of the display unit 54, such as the focusing display, hand shake alert display, flash display, shutter speed display, aperture value display and exposure correction display installed therein.

Reference numeral 110 denotes a communication unit having various communication functions including the RS232C, USB, IEEE 1394, P1284, SCSI, modem, LAN and radio communication.

Reference numeral 112 denotes a connector for connecting the image capturing apparatus 100 to another apparatus via the communication unit 110, or denotes an antenna in the case of the radio communication.

Reference numeral 200 denotes the recording medium such as the memory card or hard disk. The recording medium 200 comprises a recording unit 202 configured by a semiconductor memory, a magnetic disk and so on, an interface 204 with the image capturing apparatus 100 and a connector 206 for making a connection with the image capturing apparatus 100.

Reference numeral 210 denotes the recording medium such as the memory card or hard disk. The recording medium 210 comprises a recording unit 212 configured by a semiconductor memory, a magnetic disk and so on, an interface 214 with the image capturing apparatus 100 and a connector 216 for making a connection with the image capturing apparatus 100.

Figure 2:
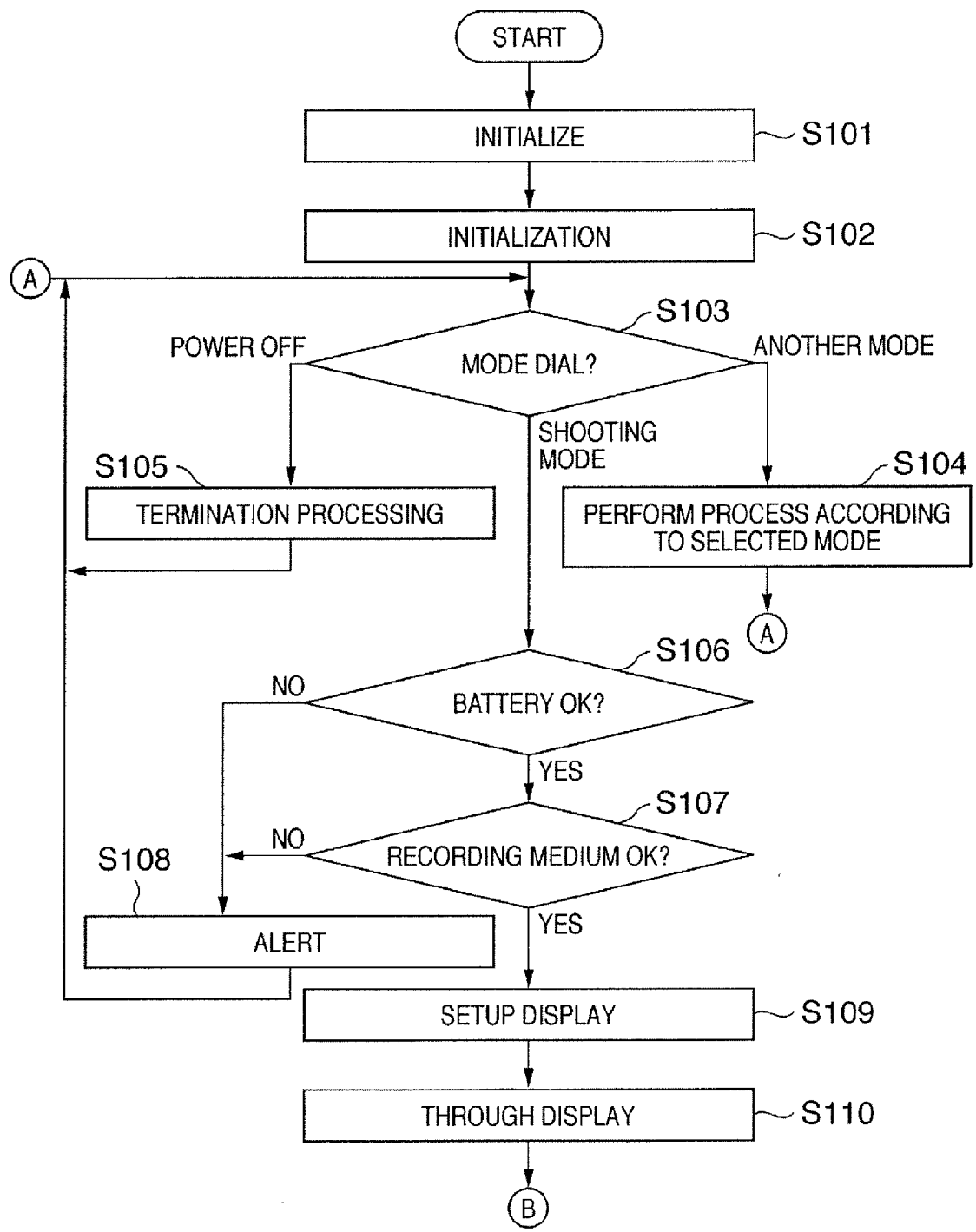
FIG. 2 is a part of a flowchart of a main routine of the image capturing apparatus according to the first embodiment of the present invention.
Figure 3:
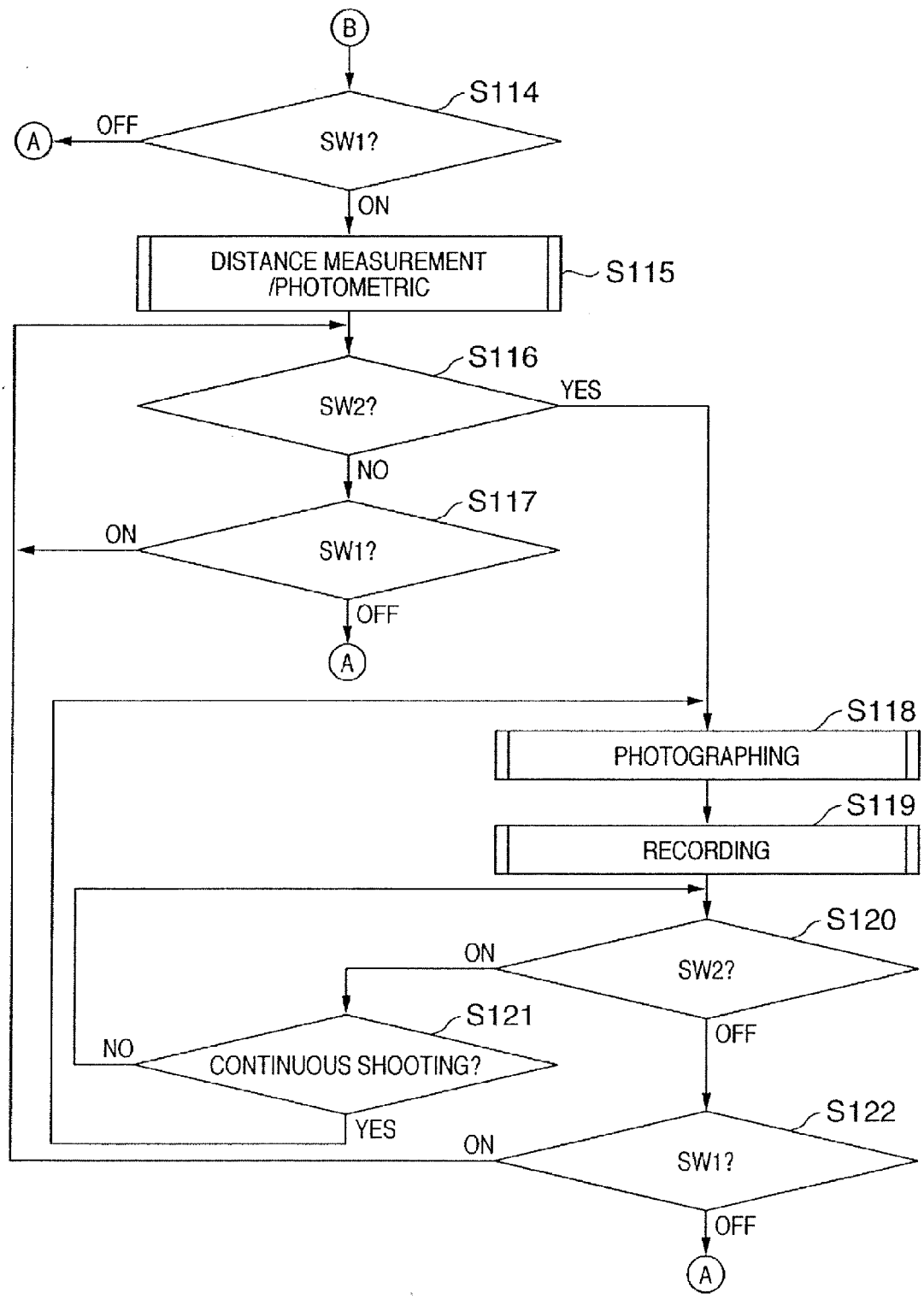
FIG. 3 is a part of the flowchart of the main routine of the image capturing apparatus according to the first embodiment of the present invention.

Next, the operation of the first embodiment will be described by referring to FIGS. 2 to 6. FIGS. 2 and 3 show flowcharts of a main routine of the image capturing apparatus 100 of this embodiment. The operation of the image capturing apparatus 100 will be described by using FIGS. 2 and 3.

On power-on such as replacement of the battery, the system control device 50 initializes flags and control variables (S101), and initializes the image display of the image display unit 28 to an off state (S102).

The system control device 50 determines a set position of the mode dial 60. If the mode dial 60 is set to power-off (S103), the system control device 50 performs predetermined termination processing, such as changing the display of each display unit to a termination state, closing the barrier of the protection unit 102 to protect the image capturing unit, recording necessary parameters and set values including the flags and control variables and setup modes in the nonvolatile memory 56, and cuts off unnecessary power of the units of the image capturing apparatus 100 including the image display unit 28 by means of the power control unit 80 (S105) so as to return to S103 thereafter.

If the mode dial 60 is set in the shooting mode (S103), it moves on to S106. If the mode dial 60 is set in another mode (S103), the system control device 50 performs a process according to the selected mode (S104) and returns to S103 on finishing the process.

In the shooting mode, the system control device 50 determines, by means of the power control unit 80, whether or not there is a problem for the operation of the image capturing apparatus 100 as to a remaining capacity and operating conditions of the power supply unit 86 configured by the batteries and so on (S106). If there is a problem, it performs a predetermined alert display with the image and voice by using the display unit 54 (S108) and then returns to S103.

If there is no problem as to the power supply unit 86 (S106), the system control device 50 determines whether or not the operational state of the recording medium 200 or 210 is problematic for the operation of the image capturing apparatus 100, and in particular, a recording and reproducing operation of the image data on the recording medium (S107). If problematic, it performs the predetermined alert display with the image and voice by using the display unit 54 (S108) and then returns to S103.

If the operational state of the recording medium 200 or 210 is not problematic (S107), the system control device 50 displays various setup statuses of the image capturing apparatus 100 with the image and voice by using the display unit 54 (S109). It is also possible to turn on the image display of the image display unit 28 so as to display various setup statuses of the image capturing apparatus 100 with the image and voice by using the image display unit 28.

Subsequently, it turns on the image display of the image display unit 28 and sets it in a through display state for sequentially displaying the shot image data (S110) so as to move on to a step 114 of FIG. 3. Here, if the shutter switch SW1 is not pushed (S114), it returns to S103. If the shutter switch SW1 is pushed (S114), the system control device 50 performs a distance measurement process to focus the objective lens 10 on an object and performs a photometric process to decide the aperture value and shutter second time (S115). In the photometric process, it sets a flash flag and sets up the flash device if necessary.

Details of the distance measurement and photometric process S115 will be described later by using FIG. 4. On finishing the distance measurement and photometric process (S115), it moves on to a next step. If the shutter switch SW2 is not pushed and the shutter switch SW1 is also released (S116, S117), it returns to S103. If the shutter switch SW2 is pushed (S116), the system control device 50 implements a photographing process consisting of the exposure process for writing the shot image data to the memory 30 via the image capturing element 14, A/D converter 16, image processing device 20 and memory control device 22 or from the A/D converter directly via the memory control device 22 and the development process for reading the image data written to the memory 30 and performing various processes by using the memory control device 22 and the image processing device 20 as required (S118). Details of the photographing process S129 will be described later by using FIG. 5.

Next, the system control device 50 reads the shot image data written to the memory 30 and implements various kinds of image processing by using the memory control device 22 and the image processing device 20 as required, performs an image compression process according to the set-up mode by using the compression/decompression device 32, and then implements the recording process for writing the image data to the recording medium 200 or 210 (S119).

Details of the recording process S119 will be described later by using FIG. 6. If the shutter switch SW2 is in a pushed state on finishing the recording process S119 (S120), the system control device 50 determines the state of a continuous shooting flag stored in an internal memory of the system control device 50 or a memory 52 (S121). If the continuous shooting flag is set up, it returns to S118 to shoot continuously and performs a next shooting.

If no continuous shooting flag is set up (S121), it repeats the current process until the shutter switch SW2 is released (S120).

If the shutter switch SW1 is in the pushed state (S122), the system control device 50 returns to S116 to prepare for the next shooting. If the shutter switch SW1 is in the released state (S122), the system control device 50 finishes a series of the shooting operations and returns to S103.

Figure 4:
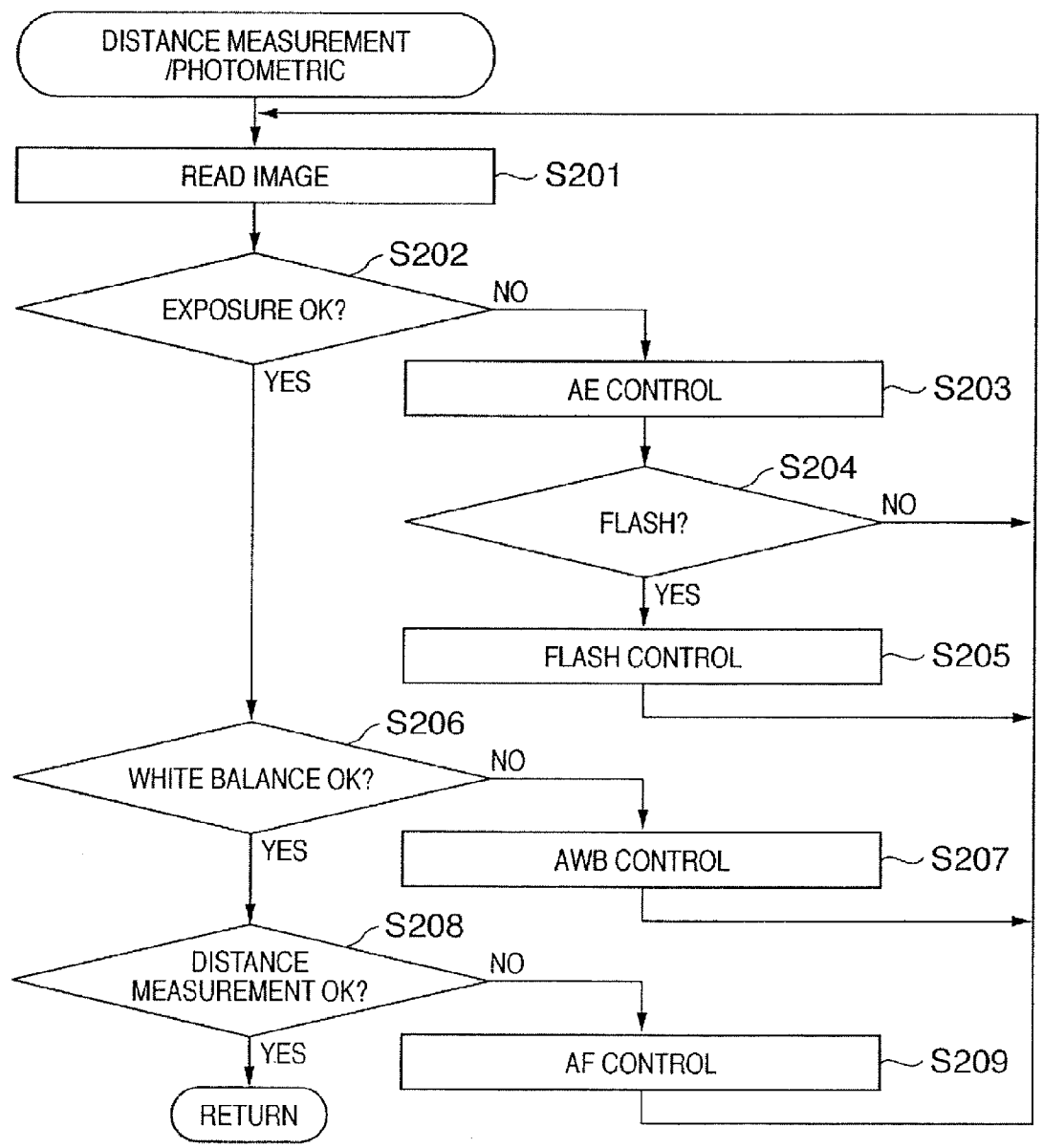
FIG. 4 is a flowchart of a distance measurement/photometric routine of the image capturing apparatus according to the first embodiment of the present invention.

FIG. 4 shows a detailed flowchart of a distance measurement/photometric process in S115 of FIG. 3. The system control device 50 reads a charge signal from the image capturing element 14, and sequentially reads the shot image data into the image processing device 20 via the A/D converter 16 (S201). The image processing device 20 uses the sequentially read image data to perform the predetermined computation to be used for the AE (automatic exposure) process and EF (flash pre-firing) process of the TTL (through the lens) method and the AF (auto focus) process.

As for the processes in this case, specific necessary portions are cut off and extracted as required out of the total number of shot pixels and are used for the computation. It is thereby possible, in the AE, EF and AWB processes of the TTL method, to perform an optimal computation in each of different modes such as a central emphasis mode, an average mode and an evaluation mode.

The system control device 50 performs AE control by means of the exposure control unit 40 by using computational results in the image processing device 20 until determined that the exposure (AE) is correct (until it becomes YES in S202) (S203).

The system control device 50 determines whether or not the flash device is necessary by using measurement data obtained by the AE control (S204). If the flash device is necessary, it prepares for the flash device by storing the flash flag in the internal memory of the system control device 50 or memory 52 (S205).

If determined that the exposure (AE) is correct (YES in S202), the measurement data and/or a setup parameter are/is stored in the internal memory of the system control device 50 or memory 52.

Next, the system control device 50 performs AWB control by using the computational results in the image processing device 20 and the measurement data obtained by the AE control until determined that the white balance (AWB) is correct (S206) while adjusting color processing parameters by means of the image processing device 20 (S207).

If determined that the white balance (AWB) is correct (YES in S206), the measurement data and/or setup parameter are/is stored in the internal memory of the system control device 50 or memory 52.

The system control device 50 performs AF control by using the measurement data obtained by the AE control and AWB control until determined that the distance measurement is in focus (S208) by means of the distance measurement control unit 42 (S209). If determined that the distance measurement (AF) is in focus (S208), it stores the measurement data and/or setup parameter in the internal memory of the system control device 50 or memory 52 (S209) so as to finish the distance measurement and photometric routine S115.

In the case of flash photography, multiple images are shot by using the auxiliary light, and an additive composition is performed thereafter while correcting displacements of the images on an image processing apparatus as described later. In this case, it is necessary to set the shutter second time to a time hardly causing the hand shake. Such a shutter second time can be acquired as follows. As for a camera using a 35 mm film, it is conventionally said that, if a focal length of the objective lens is f mm, the hand shake hardly exerts influence in the case of the shutter second time of 1/f (sec). In general, an image capturing element of a smaller-size than the 35 mm film is used as a screen size of the image capturing element 14 of the image capturing apparatus 100. It is possible, however, to acquire a focal length f' equivalent to the 35 mm film camera from a ratio of the size of the image capturing element to the 35 mm film and a real focal length of the objective lens and set the shutter second time to an inverse number thereof (1/f' (sec)) so as to acquire the shutter second time hardly causing the hand shake. A guide number of the flash device using the white LED of luminous intensity I (cd) is decided by an open F number of the lens, a maximum outreach, an ISO sensitivity and the aforementioned shutter second time t (sec) hardly causing the hand shake.

It is possible to acquire a necessary light volume from the guide number. The relation between the guide number and a light volume Q (cdsec) is as follows.

$$GNo.=0.3*\sqrt{(4\pi \times 0.0045 \times ISO\ sensitivity \times Q)} [ISO, m]$$

$$Q=I \times t. [cdsec]$$

Here, if the number of times of divided shooting is N, emission per shooting is 1/N and so the camera can be configured by the white LEDs fewer by the number of division.

The light volume on shooting is decided by distance data of a distance measurement apparatus and the aperture. If the light volume is sufficient, photographing conditions are decided in order to perform the divided shooting by decreasing the number of divided emissions or reducing the shutter second time.

If the number of photos taken is small, a vibration control effect is so little that there is no difference form the case of shooting by using no vibration control function. If the number thereof is too large, the light volume per photo becomes so low that a process of detecting a motion vector in post-processing becomes difficult or processing becomes time-consuming. 4 to 8 photos are adequate according to this embodiment.

The following will describe the case where the number of photos taken in divided shooting on flash photography is 4. However, it goes without saying that, even in the case where it is an arbitrary number, the same operation holds by correcting the contents of the following description to a certain extent.

Figure 5:
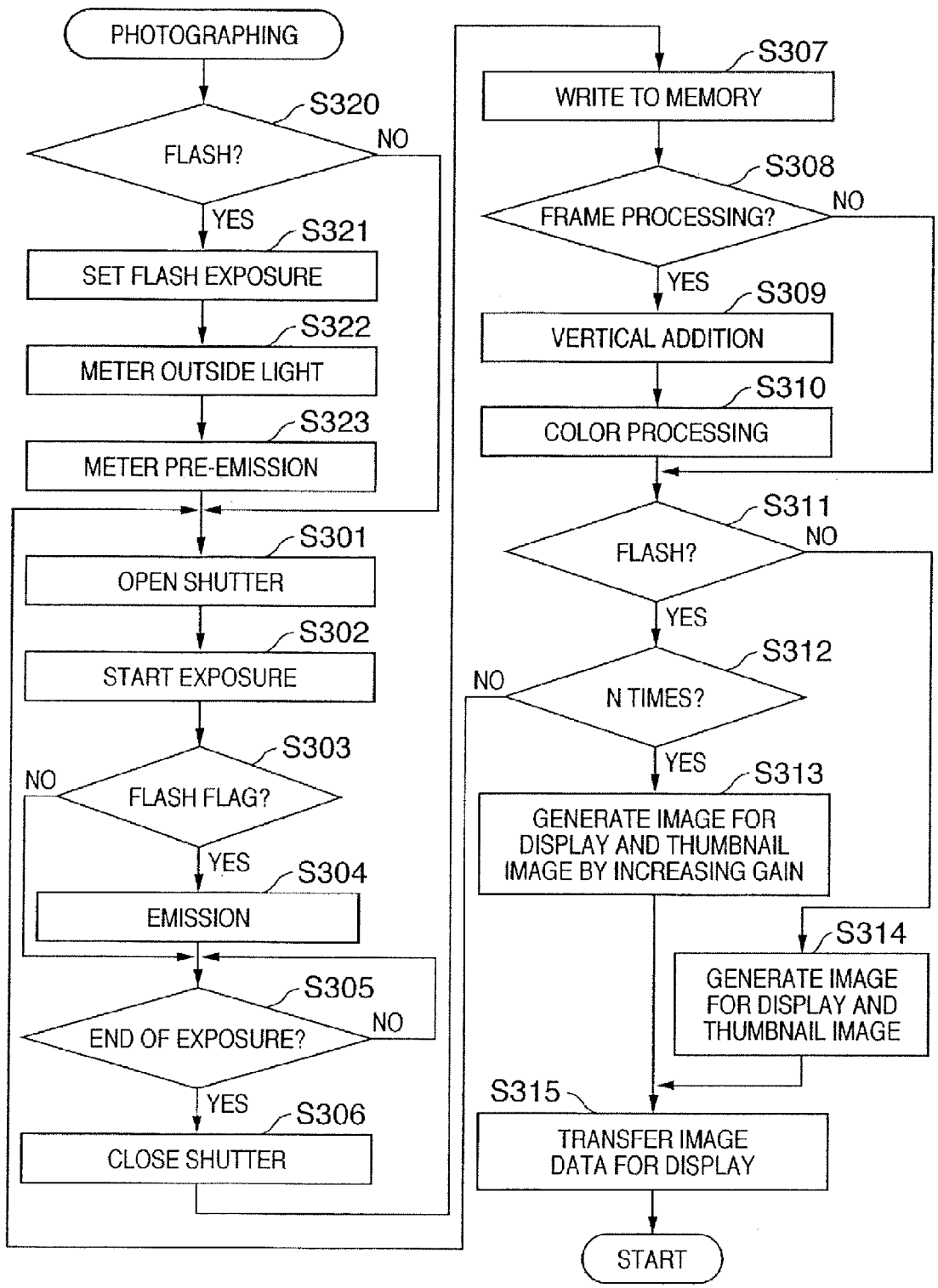
FIG. 5 is a flowchart of a photographing routine of the image capturing apparatus according to the first embodiment of the present invention.

FIG. 5 shows a detailed flowchart of the photographing process in S118 of FIG. 3.

First, in a step S320, the system control device 50 determines whether or not the emission of the flash device 48 is necessary by checking the internal memory of the system control device 50 or memory 52 as to whether the flash flag is set. If unnecessary, it directly moves on to a step S301. If necessary, it has the shutter 12 having the aperture function released according to the aperture value by the exposure control unit 40 according to photometric data stored in the internal memory of the system control device 50 or memory 52 so as to expose the image capturing element 14 (S321) and meter outside light luminance in the state of no flash device emitting light first (S322). Subsequently, the flash device 48 is controlled to perform pre-emission with the white LED as the flash device so as to meter the luminance in the state of having the flash device emitting light (S323). It calculates the volume of emission to the object and the number of times of emission N from the two pieces of obtained photometric data and stores them in the internal memory of the system control device 50 or memory 52 so as to move on to a real shooting.

The system control device 50 sets the shutter 12 having the aperture function to the aperture value corresponding to the obtained photometric data according to the photometric data stored in the internal memory of the system control device 50 or memory 52 by means of the exposure control unit 40 so as to expose the image capturing element 14 (S301, S302).

In a step S303, it determines whether or not the flash device 48 is necessary by checking whether the flash flag is set. If unnecessary, the system control device 50 performs the exposure until an end of the exposure according to the photometric data stored in the internal memory of the system control device 50 or memory 52 (S305) and moves on to a next step S306. The system control device 50 flashes the flash device when it is necessary (S304), irradiates flash light once according to the data stored in the internal memory or memory 52 and waits for the end of the exposure. If the exposure ends (S305), it closes the shutter 12 (S306), reads the charge signal from the image capturing element 14, and writes the shot image data to the image data memory 30 via the A/D converter 16, image processing device 20 and memory control device 22 or from the A/D converter directly via the memory control device 22 (S307).

If it is necessary to perform frame processing according to the set-up shooting mode (S308), the system control device 50 uses the memory control device 22 and the image processing device 20 as required to read the image data written to the image data memory 30 and sequentially performs vertical addition (S309) and color processing (S310) so as to write the processed image data to the image data memory 30 thereafter. If unnecessary, it directly moves on to a step S311.

Next, in the case where the flash flag is set (S311), it determines whether or not the flash photography is finished (S312). If not finished, it returns to S301 and repeats the steps until finishing predetermined N times of shooting. If the predetermined number of times of the flash photography is finished, it generates the image data for display for the sake of the image display after completion of the shooting and also generates thumbnail images for the sake of index display and reproduction display. Each individual image obtained by the flash photography is shot in the second time causing no hand shake and is below the correct exposure. For that reason, it is not suitable for the image data for display or thumbnail image as-is. Thus, the image data for display and thumbnail image are generated by increasing gain of the image used as a main image by the approximate number of photos to be taken (S313). To be more precise, luminance information of initial main image data is multiplied by the number of photos to be taken. For instance, in the case of composing four photos, the luminance information of an initial main image is quadrupled. Gradation properties are lost by performing such integral multiplication. However, the image considerably reduced from an original image is displayed on a liquid crystal used for the image display unit 28. Therefore, it is sufficient for the use such as a check of the composition of the shot image even if the gradation properties are lost. In the case where image information in this case is no longer linear to the luminance, it is desirable to perform the integral multiplication after converting it to the data linear to the luminance. And it moves on to a next step S315.

In the case where the flash flag is not set in S311, it does not perform the gain increasing process but generates the image data for display and thumbnail image from the shot images (S314).

And the system control device 50 reads the image data from the image data memory 30 and transfers the image data for display to the image display memory 24 via the memory control device 22 (S315). Thus, a photographing processing routine S118 is finished.

Next, a recording format of the image data of this embodiment will be described. According to this embodiment, the recording format of the image data to be recorded is compliant with an image file format standard Exif 2.2 of the image capturing apparatus and a camera file system standard DCF 1.0.

Figure 6:
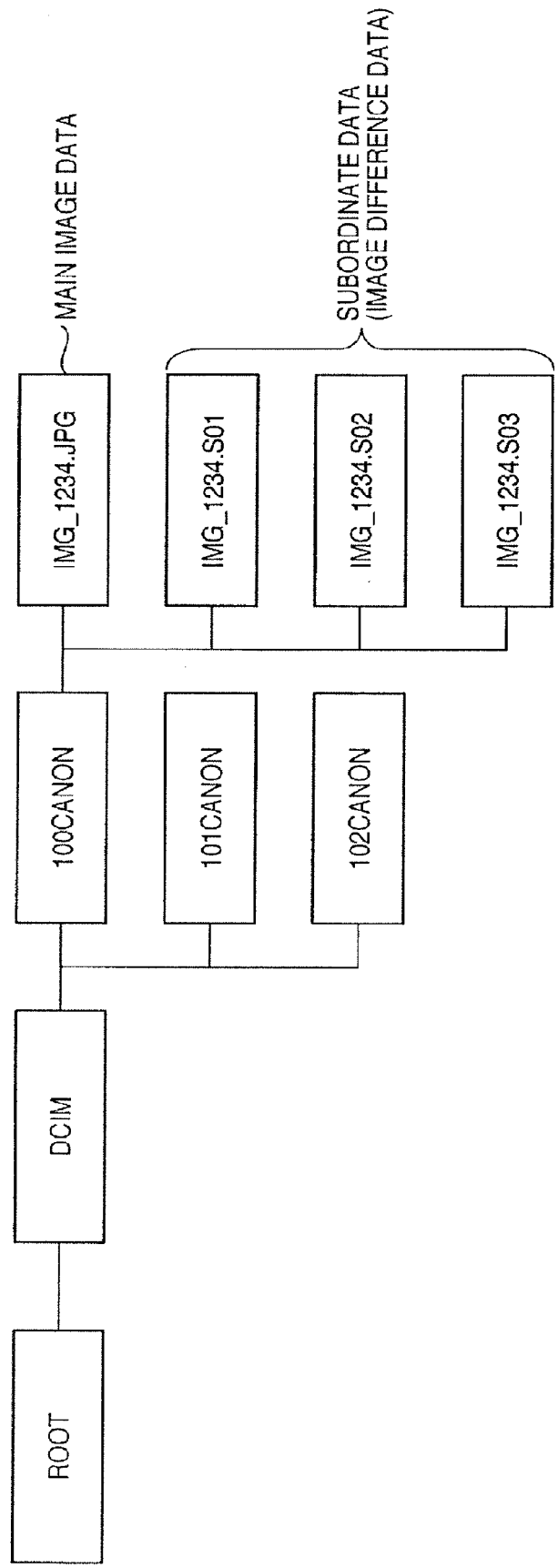
FIG. 6 is a block diagram of a recording directory of the image capturing apparatus according to the first embodiment of the present invention.

FIG. 6 shows a directory configuration and a file configuration on the recording medium of the image data of this embodiment. First, a DCIM directory which is a DCF image route directory is created immediately under a root directory. The name DCIM is fixed based on DCF. Multiple DCF directories are created under the DCIM directory. As for naming rules of the DCF directories, a directory name consists of 8 characters wherein first 3 characters between "100" and "999" represent a directory number and next 5 characters are free characters and are an arbitrary character string. In FIG. 6, the DCF directory names are temporarily "100CANON," "011CANON" and "102CANON."

The image data is recorded under the DCF directory. FIG. 6 represents an appearance of the image data recorded under the 100CANON directory.

In the case of DCF, a file name of the image data is given as 8 characters for the file name and 3 characters for an extension. As for the file name, the first 4 characters are free characters in an arbitrary character string, and the next 4 characters are a 4 digit number representing a file number in a range from "0001" to "9999." The free characters are IMG_" according to this embodiment.

Furthermore, to be able to handle an associated file group collectively, it is provided that the file group having the same file number is rendered as a DCF object. The DCF object may have different free characters and extensions if the file number is the same. As for the extensions thereof, it is provided that an extension of ".JPEG" is given to the image data recorded by a JPEG method as a DCF basic file. It is also provided that only one DCF basic file can exist in the same object.

Figure 8:
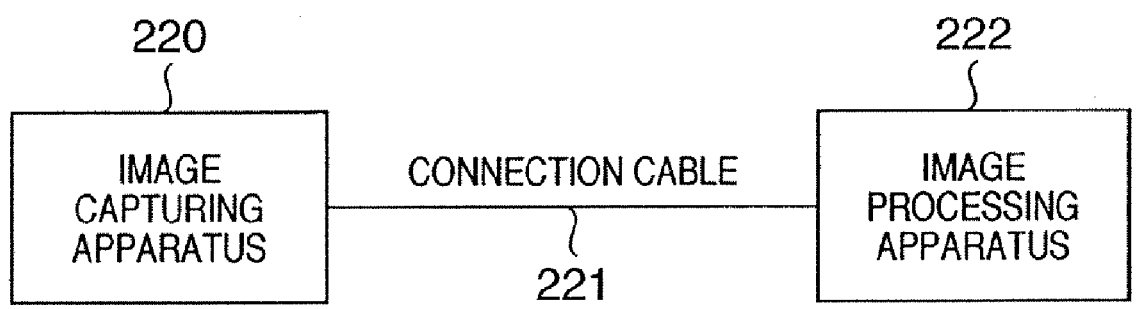
FIG. 8 is a diagram showing a connection between the image capturing apparatus and an image processing apparatus according to the first embodiment of the present invention.

According to this embodiment, in the case of the shot image on the flash photography, a first frame is the main image data for instance and given the extension of ".JPEG" per format of the DCF basic file, and is recorded under a file name of "IMG_nnnn.JPG (nnnn is an arbitrary 4-digit number in the range from "0001" to "9999," which is temporarily 1234 in FIG. 8) based on the above DCF provisions. As for the images of a second frame onward, they are recorded as subordinate image data with the same file number as the image of the first frame and an extension of ".Smm (mm is an increasing 2-digit number such as "01," "02" and "03")" under file names of "IMG_nnnn.S01," "IMG_nnnn.S02" and "IMG_nnnn.S03" and are handled as the same object. Thus, it is possible, in the image processing operation of the image processing apparatus for performing composition processing in the flash photography, to easily determine a series of associated flash-photographed images without performing a special process or data addition.

Figure 7:
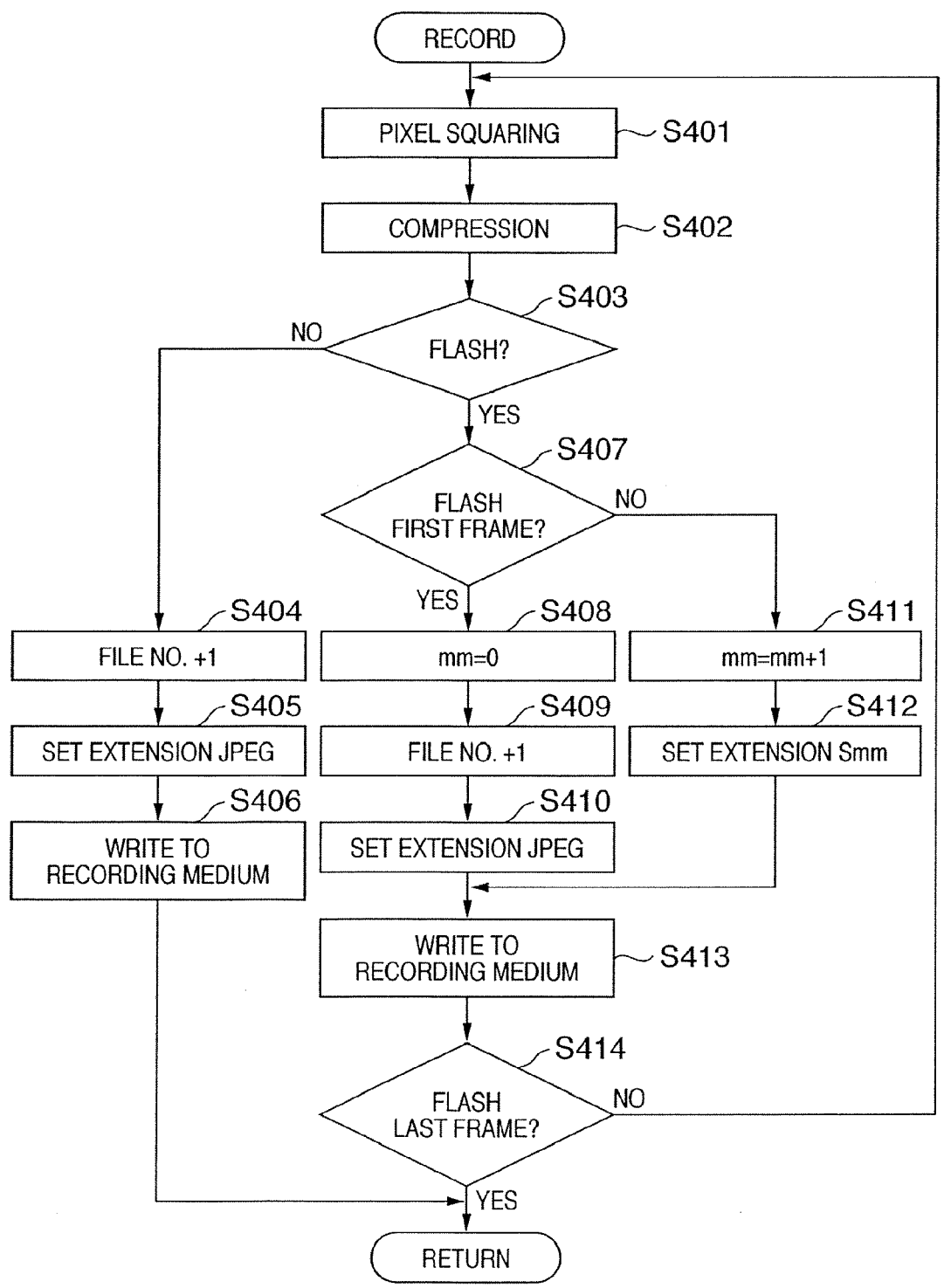
FIG. 7 is a flowchart of a recording routine of the image capturing apparatus according to the first embodiment of the present invention.

Next, the operation of the recording process will be described by using FIG. 7. FIG. 7 is a detailed flowchart corresponding to the recording process in S119 of FIG. 3.

In FIG. 7, the system control device 50 uses the memory control device 22 and the image processing device 20 as required to read the shot image data written to the image data memory 30 and performs a pixel squaring process for interpolating vertical to horizontal pixel ratio of the image capturing element to be 1:1 (S401) so as to write the processed image data to the image data memory 30 thereafter. It reads the image data written to the memory 30 and performs an image compression process according to the set-up mode by using the compression/decompression device 32 (S402).

Next, the system control device 50 determines the state of the flash flag stored in the internal memory of the system control device 50 or the memory 52 (S403). If not the flash photography, it is ordinary shooting and so 1 is added to the file number recorded last time (S404), the extension of ".JPEG" is set (S405) and the compressed image data is written to the recording medium 200 or 210 such as the memory card or CompactFlash® card via the interface 90 or 94 and connector 92 or 96 (S406). In this case, the thumbnail images for the index are also written.

On finishing writing to the recording medium, the recording process routine S119 is finished. In the case of the flash photography in S403, the system control device 50 determines whether or not it is a record of the first frame of multiple times of shooting (S407). In the case of the first frame of the flash photography, it initializes to 0 a variable mm stored in the internal memory of the system control device 50 or memory 52 for deciding an extension name of the second frame onward (S408). Next, 1 is added to the file number recorded last time (S409), the extension of ".JPEG" is set (S410) and the compressed image data is written to the recording medium 200 or 210 such as the memory card or CompactFlash® card via the interface 90 or 94 and connector 92 or 96 (S413). In this case, the thumbnail images for the index (images obtained from the main image by increasing the gain as described in S313 of FIG. 5) are also written.

It determines thereafter whether or not a last frame of the flash photography (S414), and finishes the recording process routine S119 in the case of the last frame. Otherwise, it returns to S401.

In S407, the variable mm is increased by 1 if other than the case of the first frame of the flash photography (S411). And the file number is rendered the same as that of the first frame of vibration control continuous shooting, and the extension is set by adding S to the beginning of the variable mm (S412). According to this embodiment, the number of multiple times of shooting of the flash photography is 4 frames by way of example as previously described. Thus, the second to fourth frames of the flash photography have the extensions of ".S01," ".S02" and ".S03" set thereto respectively. And the compressed image data is written to the recording medium 200 or 210 such as the memory card or CompactFlash® card via the interface 90 or 94 and connector 92 or 96 (S413). It determines thereafter whether or not a last frame of the flash photography (S414). It finishes the recording process routine S119 in the case of the last frame. Otherwise, it returns to S401.

Next, the process on the image processing apparatus side of this embodiment will be described. FIG. 8 is a diagram showing a connection state between an image capturing apparatus 220 and an image processing apparatus 222 according to the first embodiment.

The image capturing apparatus 220 and the image processing apparatus 222 are connected by a connection cable 221. The image data in the image capturing apparatus 220 is transferred to the image processing apparatus 222, where positioning and additive composition processing of multiple shot images of the flash photography are performed. The connection is made by various communication cards such as the LAN card, modem card, USB card, IEEE 1394 card, P1284 card or SCSI card connected to the interface 90 or 94 in the image capturing apparatus 220. Instead of the cable connections as above, it may be an infrared connection by IrDA or a wireless connection by a wireless LAN card such as IEEE 802.11a, 802.11b or 802.11g. It is also possible to transfer the image data via a memory medium such as the CF (CompactFlash®) card.

The image processing apparatus 222 may be in the form of a general PC, a graphic workstation (GWS) dedicated to the image processing or hardware dedicated to the image processing. It may also be in the form of a printer to be directly connected to the image capturing apparatus 220 for printing as with a direct print function.

Figure 9:
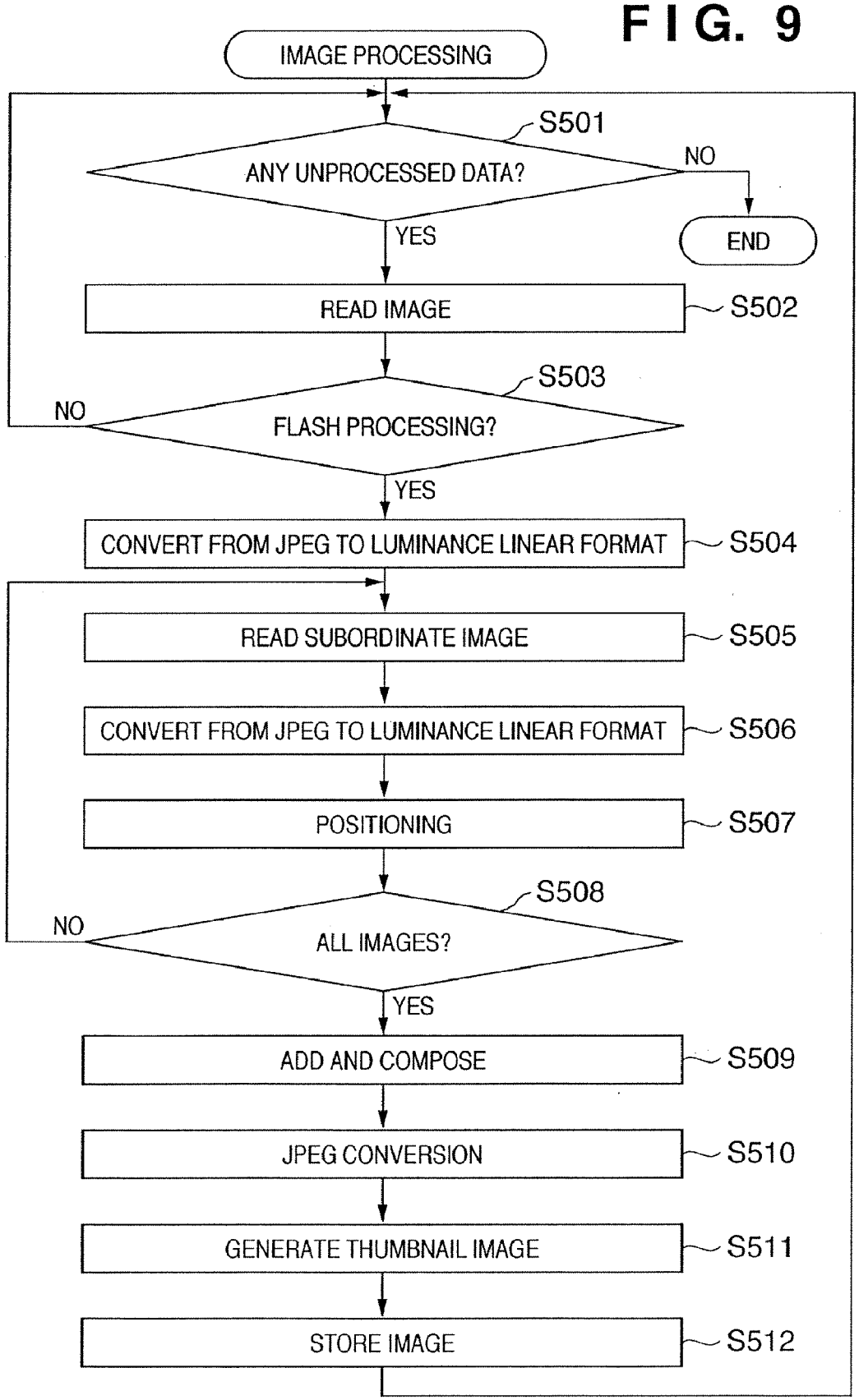
FIG. 9 is a flowchart of an image processing routine of the image processing apparatus according to the first embodiment of the present invention.

FIG. 9 is a flowchart of the image processing in the image processing apparatus 222, which shows a flow for automatically determining and processing only the images requiring a flash image composition process out of the images transferred from the image capturing apparatus 220.

First, it determines whether or not there is unprocessed data (S501). If there is no unprocessed data, it finishes the image processing. In the case where there is the unprocessed data, it reads it to the memory in the image processing apparatus (S502). Here, it reads the main image data first and reads the data having the extension ".JPEG."

Next, it determines whether or not the image requires the image processing of the flash photography (S503). In the case where the image processing for vibration control is not necessary, it returns to S501 and reads the next image data. It is possible to determine whether or not the image composition process of the flash photography is necessary by whether there is subordinate data having the same file number as the read initial main image data and the extension of Snn.

In the case where the image composition process of the flash photography is necessary, it first converts the read image data to a luminance linear format for the additive composition processing (S504). The read image data is originally in the JPEG format, and has undergone gamma processing and tone correction unique to the image capturing apparatus. If the additive processing is performed as-is, tone, brightness and contrast change due to influence of gamma and so on. For this reason, the conversion to the luminance linear format is necessary.

Next, it reads an image of the subordinate image data of the extension Snn (S505). As described in the flow of the image capturing apparatus, this data is in the JPEG format even though the extension is different so that it is converted to the luminance linear format as with the initial image data (S506).

And positioning of the initial image data and subordinate image data is performed (S507). The positioning is performed by acquiring the motion vector between the two images. A number of techniques in the public domain are proposed as to detection of the motion vector. To cite one example, the image is divided into small blocks, a two-dimensional correlation is acquired between corresponding blocks, and the motion vectors of all the corresponding blocks are acquired. The technique renders the motion vector of each area thus acquired as a histogram, and renders a mode value of the motion vector as the motion vector between the images.

On completion of the positioning, it checks whether or not there is next subordinate data (S508). If there is the data remaining, it returns to S505 and repeats the steps of reading the subordinate image data (S505), conversion to the luminance linear format (S506) and positioning with the initial image by detection of a motion vector amount (S507).

On completion of the reading, conversion and positioning of all the subordinate data, it then adds all the positioned image data and composes it (S509). As the image obtained on completion of the composition is in the luminance linear format, it is converted to the JPEG format again (S510).

As the thumbnail images up to this point in time are the images having increased the gain of only the main image, the thumbnail images are generated anew from the composed images at this time of completion of the composition (S511).

Lastly, it stores the composed images and thumbnail images (S512) and returns to S501 to process the next image data.

It is possible, as an effect of having the above configuration, to easily determine whether or not the flash photography was performed on the image processing apparatus 220 side. It is also possible, as a series of the image data on the flash photography configures the same object, to facilitate a superposition process of flash images on the image processing apparatus side.

According to this embodiment, the data which is the initial image for the image capturing apparatus 220 has the first image of the flash photography as the main image. It is also possible, however, to render any data during the continuous shooting as the main image. It is also feasible to render the image shot lastly in the continuous shooting as the main image. The first image or the last frame is rendered as the main image so as to have the effect of allowing a user to easily understand which image becomes the main image.

The determination in S503 is made according to whether or not there is the subordinate image data. It is also possible, however, to record whether or not it was shot by the flash photography in tag information of the main image data on the image capturing apparatus 220 side so as to determine it based on the tag information on the image processing apparatus 222 side.

As described above, the pre-emission is performed prior to the flash photography to decide the light volume of a real emission according to the first embodiment. Here, if the shutter second time causing no hand shake with the lens to be used is 1/60 second, irradiation is performed by dividing a flash light volume according to the shutter second time. For instance, it is divided into 10 times of 1/60 second if the shutter second time is 1/6 second, 4 times of 1/60 second if 1/15 second, and 2 times of 1/60 second if 1/30 second. Therefore, it is possible, even in the case where multiple white LEDs must be used, to reduce the quantity.

Here, an irradiation light volume is acquired by the pre-emission. In the case where distance information can be obtained as with active triangular distance measurement, a necessary light volume is calculable from ISO information and the distance information so that there is no need to perform the pre-emission.

Second Embodiment

A second embodiment is the embodiment in the case of having at least two of the speed light devices using the conventional xenon tube and the flash devices of the white LED and so on as the auxiliary lights.

As described in the first embodiment, the object in a reachable range of the flash light was dividedly shot. However, the necessary light volume increases as the distance becomes longer, and so the number of divisions becomes larger so that there may be an inconvenience of moving the object in addition to the hand shake. The speed light device has a light source of a luminance high enough to perform the shooting at a long distance. However, its flashing time is short, and so the flash device like the white LED is more advantageous as to controllability of the light volume at a short distance. The second embodiment will describe a photographing apparatus having multiple auxiliary lights leveraging the advantages of the respective devices. The second embodiment described hereunder has such a configuration.

Hereunder, the second embodiment will be described by using FIG. 10. As for the description of the embodiment, a description of the configurations and sequences in common with the first embodiment will be omitted. While the first embodiment was described in detail, the second embodiment will be described by using a simplified flowchart in particular. According to the second embodiment, the speed light device 49 comprised of the xenon tube and so on and the flash device 48 comprised of the white LED and so on are prepared in the block diagram of FIG. 1 respectively.

Figure 10:
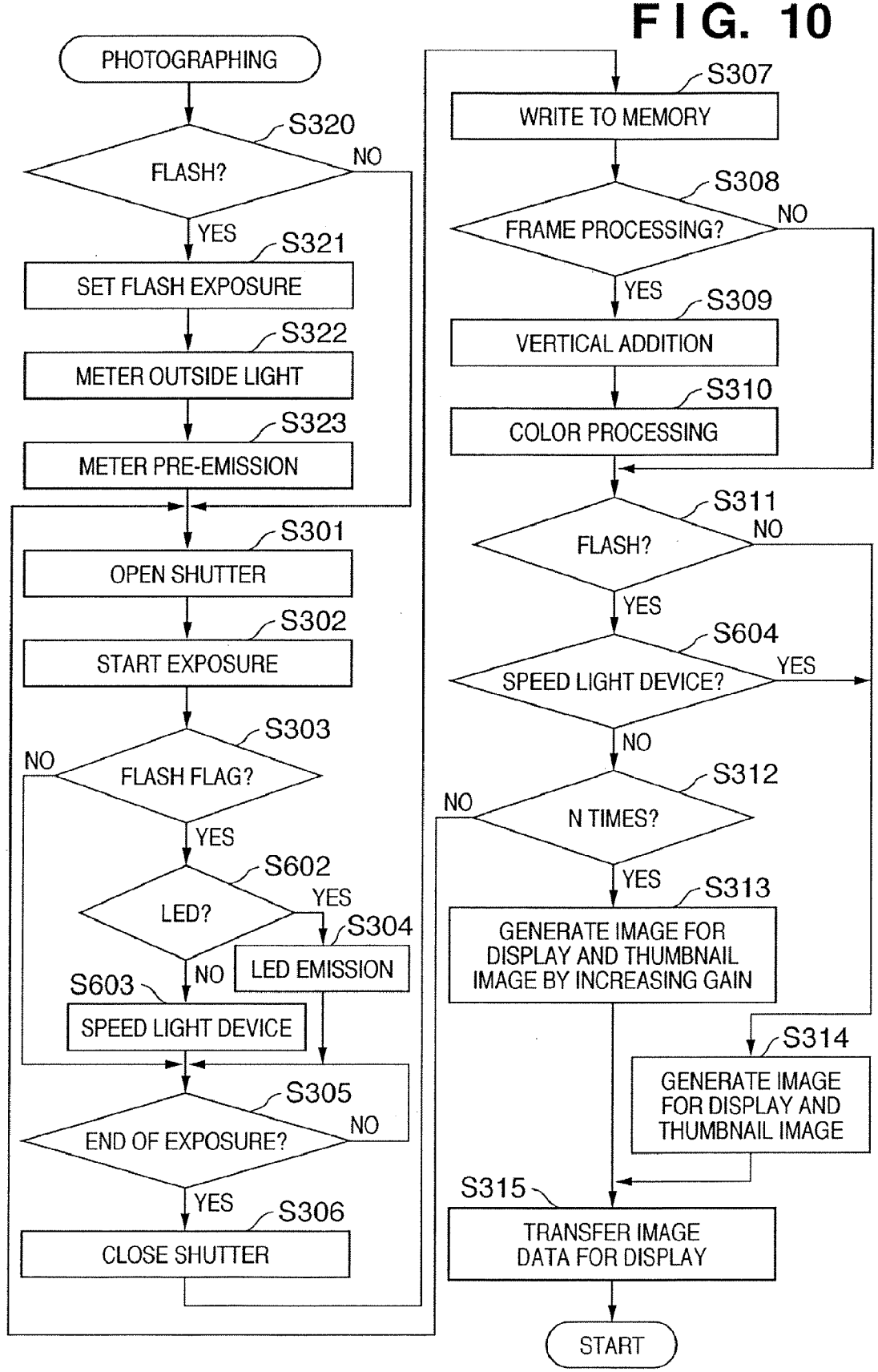
FIG. 10 is a flowchart of the photographing routine of the image capturing apparatus according to a second embodiment of the present invention.

FIG. 10 is a diagram showing the sequence on shooting of the image capturing apparatus 100 of the second embodiment. This embodiment shows a detailed flowchart of the photographing process in S118 of FIG. 3.

In the step S320, the system control device 50 determines whether or not the emission of the flash device 48 is necessary by checking whether the flash flag is set. If unnecessary, it directly moves on to a step S301. If necessary, it has the shutter 12 having the aperture function released according to the aperture value by the exposure control unit 40 according to photometric data stored in the internal memory of the system control device 50 or memory 52 so as to expose the image capturing element 14 (S321) and meter the outside light luminance in the state of no flash device emitting light first (S322). Subsequently, it performs the pre-emission prior to the shooting to meter the luminance in the state of having the flash device emitting light (S323). It calculates the volume of emission to the object and the number of times of emission N from the two pieces of obtained photometric data and stores them in the internal memory of the system control device 50 or memory 52 so as to move on to the real shooting.

The system control device 50 sets the shutter 12 having the aperture function to the aperture value corresponding to the obtained photometric data and opens it by means of the exposure control unit 40 according to the photometric data stored in the internal memory of the system control device 50 or memory 52 so as to expose the image capturing element 14 (S301, S302).

In the step S303, it determines whether or not the flash device 48 is necessary by checking whether the flash flag is set (S601). If unnecessary, the system control device 50 performs the exposure until the end of the exposure according to the photometric data stored in the internal memory of the system control device 50 or memory 52 (S305) and moves on to a next step S306. In the case where the flash device is necessary, it makes a comparison between a flash apparatus of the speed light device 49 and the flash device 48 of the white LED as to the number of times n of the object shake expected to be caused by the number of times of divided emission N of the white LED (S602). If it is the expected number of times n of the hand shake or more, the system control device 50 flashes the speed light device 49 which is the flash light (S603) and performs the exposure until the end of the exposure (S305) according to the data stored in the internal memory or memory S2. In the case where no object shake is expected, the system control device 50 flashes the flash device such as the white LED according to the data stored in the internal memory or memory 52 (S304) and performs the exposure with the white LED until the end of one of the divided exposure (S305). On finishing the exposure, it closes the shutter 12 (S306), reads the charge signal from the image capturing element 14, and writes the shot image data to the image data memory 30 via the A/D converter 16, image processing device 20 and memory control device 22 or from the A/D converter 16 directly via the memory control device 22 (S307).

If it is necessary to perform the frame processing according to the set-up shooting mode (S308), the system control device 50 uses the memory control device 22 and the image processing device 20 as required to read the image data written to the image data memory 30 and sequentially performs vertical addition (S309) and color processing (S310) so as to write the processed image data to the image data memory 30 thereafter. If unnecessary, it directly moves on to a step S311.

Next, it checks whether the flash flag is set. If the auxiliary light is unnecessary, it moves on to the step S314. In the case where the flash flag is set, it moves on to S604 (S311). In S604, if the auxiliary light is the speed light device 49, it moves on to the step S314. If the auxiliary light is the flash device of the white LED, it repeats the steps until finishing predetermined N times of shooting by the emission of the white LED. If the predetermined number of times of the flash photography is finished (S312), it moves on to S313 where it generates the image data for display for the sake of the image display after finishing the shooting and also generates thumbnail images for the sake of index display and reproduction display. Each individual image obtained by the flash photography is shot in the second time causing no hand shake and is below the correct exposure. For that reason, it is not suitable for the image for display or thumbnail image as-is. Thus, the image data for display and thumbnail image are generated by increasing the gain of the image used as the main image by the approximate number of photos to be taken (S313). To be more precise, the luminance information of the image data is multiplied by the number of photos to be taken. For instance, in the case of composing four photos, the luminance information of the image is quadrupled. The gradation properties are lost by performing such integral multiplication. However, the image considerably reduced from the original image is displayed on the liquid crystal used for the image display unit 28. Therefore, it is sufficient for the use such as a check of the composition of the shot image even if the gradation properties are lost. In the case where image information in this case is no longer linear to the luminance, it is desirable to perform the integral multiplication after converting it to the data linear to the luminance. And it moves on to the next step (S315).

In the case where the flash flag is not set when no auxiliary light is used or the auxiliary light is the speed light device 49 in S311, it does not perform the gain increasing process but generates the image data for display and thumbnail image from the shot images (S314).

And the system control device 50 reads the image data from the image data memory 30 and transfers the image data for display to the image display memory 24 via the memory control device 22 (S315). Thus, the photographing processing routine S118 is finished, the image on using the flash device is composed by using the record of the image data and the image is recorded so as to finish the series of the shooting operations.

In the above description, the speed light device of the xenon tube and the flash device of the white LED are used so as to illuminate the object in a portion of a low light volume with the flash device and that in a portion of a high light volume with the speed light device. Therefore, the flash photography of the low light volume and good optical controllability is used for the shooting at the short distance, and the speed light device of the high light volume and good optical controllability is used for the shooting at the long distance so as to improve exposure accuracy.

Third Embodiment

According to the first embodiment, the light was turned on and off by the number of times of division N. Here, it is the embodiment for keeping the light on until finishing the number of times of shooting N in the case of a series of the flash photography using the white LED and so on. As for the third embodiment, a description of the configurations and sequences in common with the first embodiment will be omitted.

Figure 11:
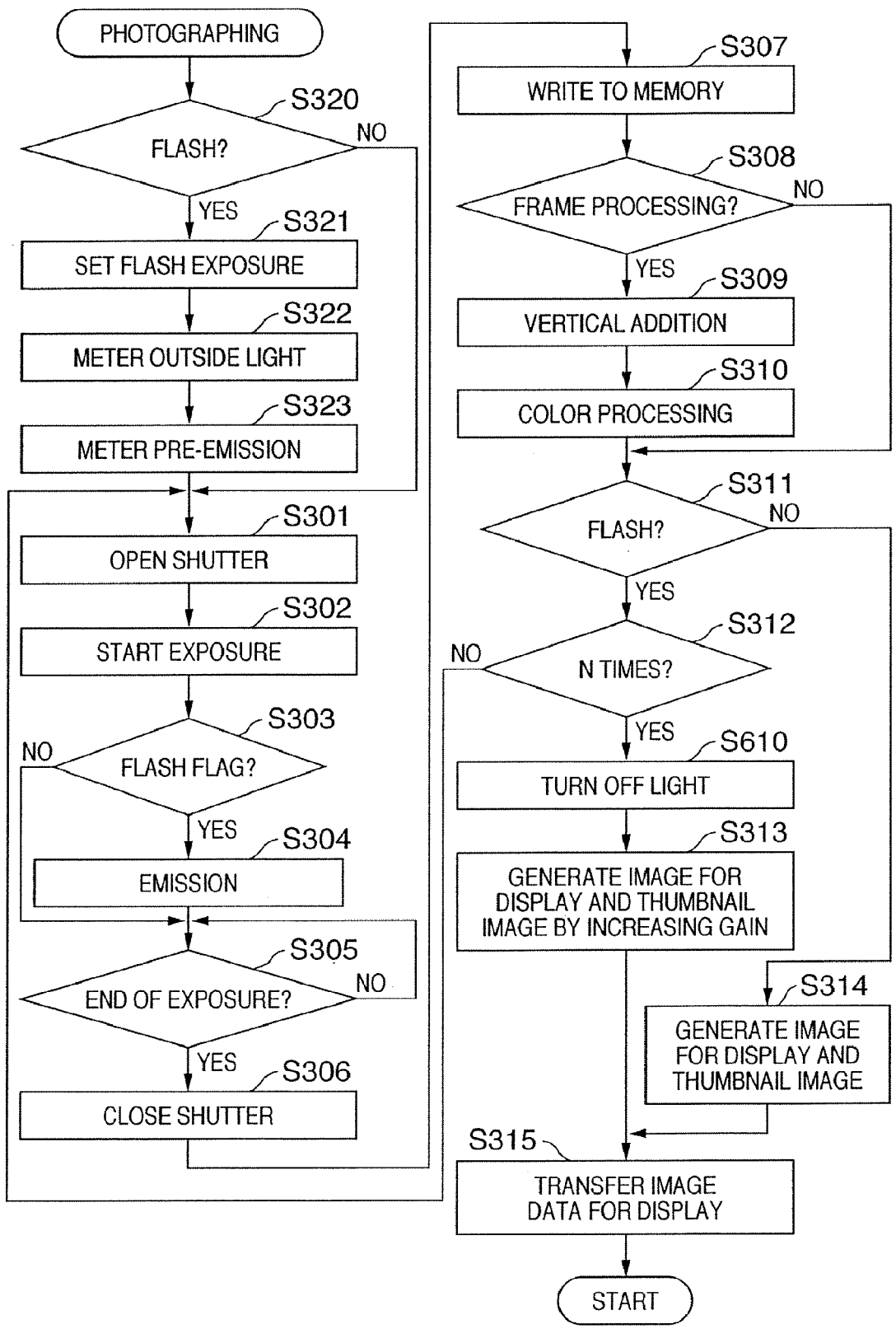
FIG. 11 is a flowchart of the photographing routine of the image capturing apparatus according to a third embodiment of the present invention.

FIG. 11 is a detailed flowchart corresponding to the photographing process in S118 of FIG. 3. First, in the step S320, the system control device 50 determines whether or not the emission of the flash device 48 is necessary by checking whether the flash flag is set. If unnecessary, it directly moves on to a step S301. If necessary, it has the shutter 12 having the aperture function released according to the aperture value by the exposure control unit 40 according to the photometric data stored in the internal memory of the system control device 50 or memory 52 so as to expose the image capturing element 14 (S321) and meter the outside light luminance in the state of no flash device emitting light first (S322).

Subsequently, the pre-emission is performed to meter the luminance in the state of having the flash device emitting light (S323). It calculates the volume of emission to the object and the number of times of emission N from the two pieces of obtained photometric data and stores them in the internal memory of the system control device 50 or memory 52 so as to move on to the real shooting.

The system control device 50 sets the shutter 12 having the aperture function to the aperture value corresponding to the obtained photometric data according to the photometric data stored in the internal memory of the system control device 50 or memory 52 by means of the exposure control unit 40 so as to expose the image capturing element 14 (S301, S302).

In the step S303, it determines whether or not the flash device 48 is necessary by checking whether the flash flag is set. If unnecessary, the system control device 50 performs the exposure until the end of the exposure according to the photometric data stored in the internal memory of the system control device 50 or memory 52 (S305) and moves on to the next step S306. The system control device 50 starts flashing the flash device when it is necessary (S304), and waits for the end of the exposure according to the data stored in the internal memory or memory 52 (S305). When the exposure ends, the flash device is turned off once according to the first embodiment. Here, it keeps the flash device on and closes the shutter 12 (S306), reads the charge signal from the image capturing element 14, and writes the shot image data to the image data memory 30 via the A/D converter 16, image processing device 20 and memory control device 22 or from the A/D converter 16 directly via the memory control device 22 (S307).

If it is necessary to perform the frame processing according to the set-up shooting mode (S308), the system control device 50 uses the memory control device 22 and the image processing device 20 as required to read the image data written to the image data memory 30 and sequentially performs the vertical addition (S309) and color processing (S310) so as to write the processed image data to the image data memory 30 thereafter. If unnecessary, it directly moves on to the step S311.

Next, in the case where the flash flag is set (S311), it determines whether or not the flash photography is finished (S311). If not finished, it returns to S301 and repeats the steps until finishing the predetermined N times of shooting. If the predetermined number of times of the flash photography is finished (S312), it turns off the flash device of the white LED which was turned on (S610), generates the image data for display for the sake of the image display after completion of the shooting and also generates thumbnail images for the sake of the index display and reproduction display. Each individual image obtained by the flash photography is shot in the second time causing no hand shake and is below the correct exposure. For that reason, it is not suitable for the image data for display or thumbnail image as-is. Thus, the image data for display and thumbnail image are generated by increasing the gain of the image used as the main image by the approximate number of photos to be taken (S313). To be more precise, the luminance information of the initial main image data is multiplied by the number of photos to be taken. For instance, in the case of composing four photos, the luminance information of the initial main image is quadrupled. The gradation properties are lost by performing such integral multiplication. However, the image considerably reduced from the original image is displayed on the liquid crystal used for the image display unit 28. Therefore, it is sufficient for the use such as the check of the composition of the shot image even if the gradation properties are lost. In the case where the image information in this case is no longer linear to the luminance, it is desirable to perform the integral multiplication after converting it to the data linear to the luminance. And it moves on to the next step (S315).

In the case where the flash flag is not set in S311, it does not perform the gain increasing process but generates the image data for display and thumbnail image from the shot images (S314).

And the system control device 50 reads the image data from the image data memory 30 and transfers the image data for display to the image display memory 24 via the memory control device 22 (S315). Thus, the photographing processing routine S118 is finished, and then the image on using the flash device is composed by using the record of the image data and the image is recorded so as to finish the series of the shooting operations.

According to the above description, the light is not turned off until divided shooting periods of N times are finished, and so it is recognizable on the main object side that it is in the period for performing one shooting operation even in the case of the divided shooting.

The above described the first to third embodiments of the present invention by using FIGS. 1 to 11.

This embodiment described the embodiment applied to a so-called digital compact camera having the lens and lens barrel integrated with its main body. However, it goes without saying that the present invention is also applicable to a single-lens reflex image capturing apparatus with interchangeable lenses or a video camera with a still image shooting function.

The shutter 12 was described as a lens shutter type for being used both as the aperture and shutter. However, the aperture and the shutter may be separate. And the shutter may be configured by a focal-plane shutter.

The image capturing apparatus may have a fixed focal length lens without a zoom function built therein. And it does not necessarily have to comprise the barrier 102. The flash device 48 may be an external flash device instead of a built-in flash device.

As for an operational system, it may be configured by combining push switches to switch the modes instead of using the mode dial.

The white light-emitting diode may be either the one using the light-emitting diodes in three colors of red, blue and green to obtain white by composing the colors or the one obtaining white by using blue and ultraviolet light-emitting diodes and phosphors.

The light source such as the white LED is not limited to the white LED, if it has equivalent performance thereto.

The image composition was performed by an external apparatus. However, it goes without saying that it may be performed by the photographing apparatus itself.

In performing the shooting by dividing the light volume of the emission obtained by the pre-emission, distance and ISO information, it is also possible to increase the number of times of shooting to meet the amount assumed for the sake of deleting the image greatly displaced on the image composition.

As for switching between the speed light device and the flash device, the speed light device may be used when an FNo. is dark in the case of a zoom lens of which open FNo. becomes dark on a tele-side.

As for the recording format of the image, the embodiment of the present invention showed the examples of recording it as the extension.JPG and recording it as the raw data based on the Exif provisions. However, the image format is not limited thereto, but may be any image format.

The format of the extension of the subordinate image data is not limited to the description of the embodiment of the present invention, but any extension other than "jpg" provided for the main data by Exif may be used.

It is possible to take the form conformable to a future revision of Exif or another new standard.

The recording media 200 and 210 may be configured, as a matter of course, not only by a memory card such as a PCM-CIA card or a CompactFlash® card or a hard disk but also by a micro DAT, a magnet-optical disk, an optical disk such as a CD-R or a CD-WR or a phase change optical disk such as a DVD. The recording media 200 and 210 may also be multi-media, as a matter of course, in which the memory card, hard disk and so on are integrated. Furthermore, a portion of the multimedia may be detachable from the multimedia as a matter of course.

According to the descriptions of the embodiments, the recording media 200 and 210 are separate from the image capturing apparatus 100 and are arbitrarily connectable thereto. However, one or all of the recording media may remain fixed to the image capturing apparatus 100 as a matter of course.

A single or any number of the recording medium 200 or 210 may be connectable to the image capturing apparatus 100 as a matter of course.

It was described that the recording media 200 and 210 are mounted on the image capturing apparatus 100. However, the recording media may be a combination of either a single or multiple recording media as a matter of course.

The image processing of the image processing apparatus for performing the image composition may be implemented either software-wise or hardware-wise.

The image processing may be in the form wherein, as with a silver salt film laboratory, the user brings the image stored in the storage medium into the laboratory or sends the image to the laboratory side by means of a communication function such as the Internet so as to perform the image composition process on the laboratory side.

Furthermore, various forms of deformed examples may be taken as far as meeting the intent of the present invention other than the above.

Other Embodiment

The present invention is also achieved by providing a storage medium having a program code of software for implementing the functions of the embodiment stored therein to a system or an apparatus and having the program code stored in the storage medium read and executed by the computer (or a CPU or MPU) of the system or apparatus. In this case, the program code itself read from the storage medium implements the functions of the aforementioned embodiment, and the storage medium having the program code stored therein configures the present invention. As for the storage medium for supplying such a program code, it is possible to use a Floppy® disk, a hard disk, an optical disk, a magnet-optical disk, a CD-ROM, a CD-R, a magnetic tape, a nonvolatile memory card, an ROM and so on.

In addition to the case where the functions of the aforementioned embodiment are implemented by having the program code read and executed by the computer, it also includes the case where an OS (Operating System) operating on the computer performs a part or all of actual processing based on the instructions of the program code so as to have the functions of the aforementioned embodiment implemented by that processing.

Furthermore, it includes the case where the program code read from the storage medium is written to the memory provided to an expansion board inserted into the computer or an expansion unit connected to the computer, and thereafter the CPU provided to the expansion board or the expansion unit performs a part or all of the actual processing based on the instructions of the program code so as to have the functions of the aforementioned embodiments implemented by that processing.

It goes without saying that, as the program code of the software for implementing the functions of the embodiments is delivered via a network, it is stored in storage means of the system or apparatus such as the hard disk or memory or the storage medium such as the CD-RW or CD-R so as to have them achieved by having the program code stored in storage means or the storage medium read and executed by the computer (or a CPU or MPU) of the system or apparatus.

DESCRIPTION OF EFFECTS

According to this embodiment, all the images to be composed are obtained by the photographing accompanied by the illumination (LED). Therefore, a luminance value of each image is smaller than that in the case of using the speed light device. However, it is possible, as the illumination of low power consumption capable of continuous emission is used, to obtain the image of a correct exposure with no hand shake by using no illumination of which light volume and power consumption are high such as the speed light device.

It is the image capturing apparatus having the white light-emitting LED as the auxiliary light of the photographing. It divides the auxiliary light when the auxiliary light is necessary and performs exposure to shoot the low-luminance image per multiple auxiliary lights, and composes the multiple images thereby obtained so as to obtain the image of the correct exposure. Therefore, the light volume is lower than that in the case of rendering it correct just by performing the exposure once so that it is possible to decrease the light volume of one or multiple light-emitting diodes or a required quantity thereof. Thus, the cost and space can be reduced, which is effective in terms of miniaturization.

The light volume of the white LED auxiliary light is divided in the second time causing no hand shake so as to have the effect of facilitating the image composition.

It performs divided exposure with the emission of the auxiliary light to be a predetermined exposure amount by means of the shutter in the second time causing no hand shake, and turns off the light after becoming the predetermined exposure so as to have the white light-emitting LED continuously lighting during the continuous shooting. Therefore, it is recognizable that the main object is in the shooting of one time.

It has a white light-emitting LED and the speed light device of the xenon tube as the auxiliary light for the photographing. Of the white light-emitting LED of a low luminance and the speed light device of a high luminance, the auxiliary light by means of the white light-emitting LED or that by means of the speed light device is selected in the case where the distance is long or in the case where the FNo. of the lens is dark, that is, depending on photographing conditions related to GNo. In the case of a relatively short distance and when using the auxiliary light of the white light-emitting LED, it divides the auxiliary light and performs the exposure to shoot the low-luminance image per multiple auxiliary lights and compose the multiple images thereby obtained so as to obtain the image of the correct exposure. In the case of a relatively long distance, it performs the photographing with the speed light device of a correct exposure once. Thus, in the case of the relatively short distance, it has the effects of eliminating the time necessary to charge the speed light device, facilitating emission control and improving dimmer accuracy because of the emission volume of the white light-emitting LED which is more stable than that of the speed light device.

Here, as for the photographing condition, GNo. of the auxiliary light is indicated as a product of FNo. indicating brightness of the lens and the distance. It is understandable that, in the case of a dark lens or a distant object, the effect of improving snapshot performance can be expected in addition to the above-mentioned dimmer accuracy by using the speed light device rather than performing a large number of multiple times of emission in the photographing with the white LED.

It is also possible to improve the snapshot performance based on the photographing condition that the number of times of divided emission of the white light-emitting LED is larger than the predetermined number of times.

In the case of composing the images shot per multiple lights of the white light-emitting LED, the number of composition shots increases and occurrence of the object shake is expected. If forcibly composed, such greatly displaced images will generate an unnatural composed image. Thus, it is possible to perform natural composition by eliminating such greatly displaced images.

Furthermore, as for the white light-emitting LED, white color may be obtained either by composing the three colors of red, blue and green or by irradiating the phosphors with the blue and ultraviolet light-emitting LED and performing the color conversion. Either one may be used according to the present invention.

As many apparently widely different embodiments of the present invention can be made without departing from the spirit and scope thereof, it is to be understood that the invention is not limited to the specific embodiments thereof except as defined in the appended claims.

What is claimed is:

1. An image capturing apparatus which performs photographing multiple times with an illumination light of an illumination unit and composes these multiple images to obtain a composite image of a correct exposure, the apparatus comprising:
   an image capturing unit adapted to capture an optical image of an object as an electrical signal;
   an image composition unit adapted to compose multiple images obtained by multiple times of photographing by the image capturing unit; and
   an illumination light amount setting unit adapted to set a light amount of the illumination unit;
   wherein:
   all of the multiple images are the images shot by performing illumination with the illumination unit,
   the illumination light amount setting unit sets a light amount for each of the multiple images performed with the illumination of the illumination unit to be a light amount obtained by dividing a light amount for the correct exposure based on a number of images taken of an image to be composed, and
   the illumination unit continues the emission until the predetermined number of times of photographing is finished.

2. The image capturing apparatus according to claim 1, wherein exposure time of each photographing in multiple times of photographing by performing illumination with the illumination unit is exposure time enough to cause little hand shake.

3. The image capturing apparatus according to claim 1, wherein the illumination unit is a light-emitting diode.

4. An image capturing method for an image capturing apparatus which performs photographing multiple times with an illumination light of an illumination unit and composes these multiple images to obtain a composite image of a correct exposure, the method comprising:
   an image capturing step of capturing an optical image of an object as an electrical signal;
   an image composition step of composing multiple images obtained by multiple times of photographing in the image capturing step; and an illumination light amount setting step of setting a light amount of the illumination unit;

wherein:

all of the multiple images are the images shot by performing illumination with the illumination unit, the illumination light amount setting step sets a light amount for each of the multiple images performed with the illumination of the illumination unit to be a light amount obtained by dividing a light amount for the correct exposure based on the number of images taken of an image to be composed, and the illumination unit continues the emission until the predetermined number of times of photographing is finished.

* * * * *